United States Patent [19]

Nakano et al.

[11] Patent Number: 5,382,416
[45] Date of Patent: Jan. 17, 1995

[54] METHOD FOR PURIFYING EXHAUST GAS

[75] Inventors: Masao Nakano, Hikari; Akinori Eshita; Kazuhiko Sekizawa, both of Shinnanyo, all of Japan

[73] Assignee: Tosoh Corporation, Shinnanyo, Japan

[21] Appl. No.: 218,294

[22] Filed: Mar. 28, 1994

Related U.S. Application Data

[63] Continuation of Ser. No. 54,207, Apr. 30, 1993, abandoned, which is a continuation of Ser. No. 805,956, Dec. 12, 1991, Pat. No. 5,208,198.

[30] Foreign Application Priority Data

| Dec. 18, 1990 | [JP] | Japan | 2-411254 |
| Dec. 18, 1990 | [JP] | Japan | 2-411255 |
| Dec. 18, 1990 | [JP] | Japan | 2-411256 |
| Dec. 18, 1990 | [JP] | Japan | 2-411257 |

[51] Int. Cl.$^6$ ............... B01J 8/06; B01D 53/36; C01B 21/00
[52] U.S. Cl. ............... 423/213.2; 423/213.5; 423/239.2; 423/245.3; 423/247
[58] Field of Search ............... 502/66, 74; 423/213.2, 423/213.5, 239.2, 247, 245.3

[56] References Cited

U.S. PATENT DOCUMENTS

| 5,206,196 | 4/1993 | Nakano et al. | 502/65 |
| 5,208,198 | 5/1993 | Nakano et al. | 502/74 |
| 5,219,545 | 6/1993 | Kagana et al. | 423/239.2 |
| 5,223,236 | 6/1993 | Inoue et al. | 423/213.2 |
| 5,270,024 | 12/1993 | Kasahara et al. | 423/213.2 |

FOREIGN PATENT DOCUMENTS

| 16761 | 1/1984 | Australia. | |
| 4260441 | 9/1992 | Japan | 423/239.2 |

*Primary Examiner*—Carl F. Dees
*Attorney, Agent, or Firm*—Oblon, Spivak, McClelland, Maier & Neustadt

[57] ABSTRACT

A catalyst for purifying an exhaust gas to remove nitrogen oxides, carbon monoxide and hydrocarbons from an oxygen-rich exhaust gas containing nitrogen oxides, carbon monoxide and hydrocarbons, comprising (i) a zeolite having an $SiO_2/Al_2O_3$ mole ratio of at least 15 and (ii) (a) cobalt, (b) an alkaline earth metal and (c) silver, or nickel and/or zinc, or platinum and/or manganese, or copper and/or rhodium, incorporated thereinto.

16 Claims, No Drawings

METHOD FOR PURIFYING EXHAUST GAS

This application is a continuation of application Ser. No. 08/054,207, filed on Apr. 30, 1993, now abandoned, which was a Rule 60 Continuation of Ser. No. 07/805,956, filed Dec. 12, 1991, now U.S. Pat. No. 5,208,198.

BACKGROUND OF THE INVENTION

1. Field of the Invention

The present invention relates to a catalyst for purifying an exhaust gas to remove nitrogen oxides, carbon monoxide and hydrocarbons contained in an exhaust gas discharged, for example, from internal combustion engines of automobiles and the like, and in particular, to a catalyst for removing nitrogen oxides contained in an oxygen-rich exhaust gas.

The term "oxygen-rich exhaust gas" used in the present invention is intended to mean an exhaust gas containing oxygen in an amount exceeding the amount of oxygen necessary for completely oxidizing carbon monoxide and hydrocarbons and hydrogen contained in the exhaust gas.

2. Description of the Related Art

Nitrogen oxides, carbon monoxide and hydrocarbons, which are toxic substances contained in an exhaust gas discharged from internal combustion engines, are removed, for example, through the use of a three-way catalyst comprising Pt, Rh, Pd, etc., supported on a carrier material. In the case of an exhaust gas discharged from diesel engines, however, no effective catalyst exists for removing nitrogen oxides because the exhaust gas contains a large amount of oxygen, and thus a purification of the exhaust gas by a catalyst has not been realized.

In recent gasoline engines, a lean burn combustion is used for lowering the fuel consumption and reducing the amount of exhausted carbon dioxide gas, but an exhaust gas from this lean burn gasoline engine comprises an atmosphere containing an excessive amount of oxygen, and therefore, it is impossible to use the above-mentioned conventional three-way catalyst, and thus a method of removing toxic components from the exhaust gas has not been put to practical use.

Examples of the method of removing particularly nitrogen oxides in an exhaust gas containing an excessive amount of oxygen include that wherein a reducing agent such as ammonia is added, and that wherein the nitrogen oxides are absorbed in an alkali to remove same. These methods are not effective for automobiles, which are a moving nitrogen oxides source, and thus the application thereof is limited.

Recently it has been reported that a zeolite catalyst subjected to an ion exchange with a transition metal can remove nitrogen oxides in an exhaust gas containing an excessive amount of oxygen, without the addition of a special reducing agent such as ammonia. For example, Japanese Unexamined Patent Publication (Kokai) Nos. 63-283727 and 1-130735 propose a catalyst able to selectively reduce nitrogen oxides even in an exhaust gas containing an excessive amount of oxygen and minor amounts of reducing agents such as unburnt carbon monoxide and hydrocarbons.

The activity of the above-mentioned catalysts proposed in the art, however, is remarkably deteriorated when used at a high temperature for a long time, and thus it is necessary to improve the durability and catalytic performance thereof.

Accordingly, to solve the above-described problems, a catalyst for purifying an exhaust gas comprising a zeolite having an $SiO_2/Al_2O_3$ mole ratio of at least 15, and incorporated therein cobalt and an alkaline earth metal, has been proposed (see Japanese Patent Application No. 1-337249).

Although the exhaust gas purification catalyst proposed in Japanese Patent Application No. 1-337249 has an improved durability, the temperature region in which the nitrogen oxides can be removed is relatively narrow. Therefore, a higher capability of removing nitrogen oxides in a broader temperature region, particularly at a low temperature, is required from a catalyst for purifying an exhaust gas discharged, in particular, from automobiles.

SUMMARY OF THE INVENTION

Accordingly, the objects of the present invention are to eliminate the above-mentioned disadvantages of the prior art and to provide a catalyst for purifying an exhaust gas capable of simultaneously removing nitrogen oxides, carbon monoxide and hydrocarbons from an exhaust gas discharged from, for example, internal combustion engines of automobiles, which catalyst is less susceptible to thermal deterioration and has a high catalytic activity.

Other objects and advantages of the present invention will be apparent from the following description.

The present inventors have found that the incorporation of any one of (1) silver,
(2) nickel and/or zinc,
(3) platinum and/or manganese, and
(4) copper and/or rhodium, in the above-mentioned catalyst for purifying an exhaust gas comprising a zeolite having an $SiO_2/Al_2O_3$ mole ratio of at least 15, and incorporated therein cobalt and an alkaline earth metal, improves the capability of the catalyst of removing nitrogen oxides, and thus completed the present invention.

Accordingly, the present invention provides a catalyst for purifying an exhaust gas to remove nitrogen oxides, carbon monoxide and hydrocarbons from an oxygen-rich exhaust gas containing nitrogen oxides, carbon monoxide and hydrocarbons, comprising (i) a zeolite having an $SiO_2/Al_2O_3$ mole ratio of at least 15 and (ii), incorporated thereinto, (a) cobalt and (b) an alkaline earth metal and (c) any one of (1) silver,
(2) nickel and/or zinc,
(3) platinum and/or manganese, and
(4) copper and/or rhodium.

DESCRIPTION OF THE PREFERRED EMBODIMENTS

The present invention will now be described in more detail.

The catalyst for purifying an exhaust gas according to the present invention comprises (i) a zeolite having an $SiO_2/Al_2O_3$ mole ratio of at least 15 and (ii) incorporated therein, (a) cobalt, (b) an alkaline earth metal (e.g., Ca, Mg, Sr, Ba) and (c) any one of (1) silver,
(2) nickel and/or zinc,
(3) platinum and/or manganese, and
(4) copper and/or rhodium.

The above-mentioned zeolite generally has the following composition:

$$xM_{2/n}O \cdot Al_2O_3 \cdot ySiO_2 \cdot zH_2O$$

wherein n is a valency of the cation, x is 0.8 to 1.2, y is at least 2, and z is at least 0 (zero). In the zeolite used in the present invention, the $SiO_2/Al_2O_3$ mole ratio is preferably at least 15. There is no particular limitation of the upper limit of the $SiO_2/Al_2O_3$ mole ratio, but when the $SiO_2/Al_2O_3$ mole ratio is less than 15, the heat resistance and durability of the zeolite per se are low, and thus the heat resistance and durability of the catalyst are unsatisfactory. The $SiO_2/Al_2O_3$ mole ratio is more preferably about 15 to 1000.

The zeolite constituting the catalyst of the present invention may be a naturally occurring zeolite or a synthetic zeolite. There is no particular limitation of the method of producing the zeolite. Representative examples of the zeolite used in the present invention include ferrierite, Y, ZSM-5, ZSM-11, ZSM-12 and ZSM-20. These zeolites per se may be used as the catalyst of the present invention, or used after treatment with an ammonium salt, a mineral acid or the like for ion exchange to form an $NH_4$ or H type zeolite.

The zeolite used in the present invention contains (a) cobalt, (b) alkaline earth metal and (c) any one of
(1) silver,
(2) nickel and/or zinc,
(3) platinum and/or manganese, and
(4) copper and/or rhodium.

There is no particular limitation of the method of incorporating the above-described metals in the zeolite, and in general, the above-mentioned metals can be incorporated by an ion exchange method, an impregnation method, and an evaporation-to-dryness method through the use of a water soluble salt. The above-mentioned metals may be incorporated at one time, or may be successively incorporated.

When incorporating the above-mentioned metals in the zeolite, the concentration of individual metal ions in the aqueous solution can be properly selected depending upon the intended percentage ion exchange of the catalyst. Examples of the alkaline earth metal ions include Ca, Mg, Sr and Ba. The above-mentioned metal ions may be used in the form of a soluble salt, and suitable examples of the soluble salt include nitrate, acetate, oxalate and chloride.

Regarding the contents of the above-mentioned metals in terms of mole ratio to the alumina in the zeolite, the contents of cobalt and an alkaline earth metal are preferably 0.1 to 1.5 times, more preferably 0.2 to 1.4 times and 0.1 to 1 time, more preferably 0.2 to 1 time respectively. Further,
1) preferably the content of silver is 0.05 to 2 times, more preferably 0.1 to 1.8 times, and the total content of cobalt, alkaline earth metal and silver is 1.0 to 2.5 times, more preferably 1.0 to 2.3 times,
2) preferably the content of nickel and/or zinc is 0.05 to 2 times, more preferably 0.1 to 1.8 times, and the total content of cobalt, alkaline earth metal and nickel and/or zinc is 1.0 to 2.5 times, more preferably 1.0 to 2.3 times,
3) preferably the content of platinum and/or manganese is 0.05 to 1.5 times, more preferably 0.1 to 1.4 times, and the total content of cobalt, alkaline earth metal and platinum and/or manganese is 1.0 to 2.5 times, more preferably 1.0 to 2.3 times, and
4) preferably the content of copper and/or rhodium is 0.05 to 1.5 times, more preferably 0.1 to 1.4 times, and the total content of cobalt, alkaline earth metal and copper and/or rhodium is 1.0 to 2.5 times, more preferably 1.0 to 2.3 times.

The sample containing the above-mentioned metals is generally used after solid-liquid separation, washing and drying, and if necessary, can be used after calcination.

The catalyst for purifying an exhaust gas according to the present invention may be used after mixing with a binder, such as a clay mineral, and then molding. Alternatively, the zeolite may be previously molded, and the above-mentioned metals may be incorporated into the molding. Examples of the binder used in molding of the zeolite include clay minerals such as kaolin, attapulgite, montmorillonite, bentonite, allophane and sepiolite, silica and alumina. Alternatively, the catalyst may be a binder-less zeolite molding directly synthesized without the use of a binder. Further, the zeolite may be washcoated on a honeycomb-structured base material made of cordierite, a metal or the like.

The nitrogen oxides, carbon monoxide and hydrocarbons contained in an oxygen-rich exhaust gas can be removed by bringing the exhaust gas into contact with the exhaust gas purification catalyst according to the present invention in any conventional manner. Specific examples of such an exhaust gas include exhaust gases discharged, for example, from the internal combustion engines of automobiles, particularly exhaust gases produced at a high air/fuel ratio (i.e., in the lean burn region).

There is no particular limitation in the operating conditions of the catalyst according to the present invention, but the preferable temperature is 100° C. to 900° C. more preferably 150° C. to 800° C. and the preferable space velocity is 1,000 to 500,000 $hr^{-1}$. The "space velocity" means a value of a gas flow rate (cc/hr) divided by a catalyst volume (cc).

The above-mentioned catalyst for removing an exhaust gas exhibits no change in the performance even when applied to an exhaust gas containing carbon monoxide, hydrocarbons and hydrogen but not containing an excessive amount of oxygen.

EXAMPLES

The present invention will now be further illustrated by, but is by no means limited to, the following Examples.

Comparative Example 1

Preparation of Comparative Catalyst 1

A ZSM-5-like zeolite was synthesized according to the method described in Example 5 of Japanese Unexamined Patent Publication (Kokai) No. 59-54620. The zeolite had the following composition in terms of mole ratios of oxides on an anhydrous basis:

$$1.1\ Na_2O \cdot Al_2O_3 \cdot 40\ SiO_2$$

The zeolite was ion-exchanged with an aqueous ammonium chloride solution, 200 g of the resultant ammonium type ZSM-5 was put in 1800 ml of a 1.09 mol/liter aqueous barium chloride solution, and the mixture was stirred at 80° C. for 16 hrs. The stirred mixture was subjected to solid-liquid separation, washed with water, subsequently put in 700 ml of a 0.23 mol/liter aqueous cobalt (II) acetate tetrahydrate solution, and the mixture was stirred at 80° C. for 16 hrs. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, washed with water, and dried at 110° C. for 10 hrs, to prepare a comparative catalyst 1. The catalyst was subjected to a chemical analysis to determine the barium and cobalt contents, and as a result, it was found that the barium and cobalt contents were respectively 0.58 time and 0.49 time as a divalent cobalt, based on the number of moles of $Al_2O_3$ in the zeolite.

Example 1

Preparation of Catalyst 1

A 15 g amount of comparative catalyst 1 prepared in Comparative Example 1 was put in 22 ml of a 0.025 mol/liter aqueous silver nitrate solution, dried under a reduced pressure while stirring, and further dried at 110° C. for 16 hrs, to thereby prepare a catalyst 1. The catalyst was subjected to a chemical analysis to determine the contents of barium, cobalt and silver, and as a result, it was found that barium, cobalt and silver were contained in respective amounts of 0.58 time, 0.49 time as divalent cobalt and 0.1 time, based on the number of moles of $Al_2O_3$ in the zeolite.

Example 2

Preparation of Catalyst 2

A 15 g amount of comparative catalyst 1 prepared in Comparative Example 1 was put in 43 ml of a 0.05 mol/liter aqueous silver nitrate solution, dried under a reduced pressure while stirring, and further dried at 110° C. for 16 hrs, to thereby prepare a catalyst 2. The catalyst was subjected to a chemical analysis to determine the contents of barium, cobalt and silver, and as a result, it was found that barium, cobalt and silver were contained in respective amounts of 0.58 time, 0.49 time as divalent cobalt and 0.4 time, based on the number of moles of $Al_2O_3$ in the zeolite.

Example 3

Preparation of Catalyst 3

A 15 g amount of comparative catalyst 1 prepared in Comparative Example 1 was put in 43 ml of a 0.05 mol/liter aqueous silver nitrate solution, and the mixture was stirred at 80° C. for 16 hrs. The stirred mixture was subjected to solid-liquid separation, washed with water, and dried at 110° C. for 16 hrs, to thereby prepare a catalyst 3. The catalyst was subjected to a chemical analysis to determine the contents of barium, cobalt and silver, and as a result, it was found that barium, cobalt and silver were contained in respective amounts of 0.57 time, 0.48 time as divalent cobalt and 0.13 time, based on the number of moles of $Al_2O_3$ in the zeolite.

Example 4

Preparation of Catalyst 4

A 20 g amount of ammonium type ZSM-5 prepared in Comparative Example 1 was put in 180 ml of a 1.09 mol/liter aqueous barium chloride solution, and the mixture was stirred at 80° C. for 16 hrs. The stirred mixture was subjected to solid-liquid separation, thoroughly, washed with water, subsequently put in 180 ml of a 0.23 mol/liter aqueous cobalt (II) nitrate tetrahydrate solution, and the mixture was stirred at 80° C. for 16 hrs. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, thoroughly washed with water, and dried at 110° C. for 10 hrs, and the procedure of Example 2 was repeated to prepare a catalyst 4. The catalyst was subjected to a chemical analysis to determine the contents of barium, cobalt and silver, and as a result, it was found that barium, cobalt and silver were contained respectively in amounts of 0.52 time, 0.32 time as divalent cobalt and 0.4 time, based on the number of moles of $Al_2O_3$ in the zeolite.

Example 5

Preparation of Catalysts 5

A 20 g amount of ammonium type ZSM-5 prepared in Comparative Example 1 was put in 180 ml of a 0.2 mol/liter aqueous silver nitrate solution, and the mixture was stirred at 80° C. for 16 hrs. The stirred mixture was subjected to solid-liquid separation, the resultant zeolite cake was put in a freshly prepared aqueous solution having the above-mentioned composition, and the above-mentioned procedure was repeated. The slurry was subjected to solid-liquid separation, thoroughly washed with water, subsequently put in 180 ml of a 1.09 mol/liter aqueous barium chloride solution, and the mixture was stirred at 80° C. for 16 hrs. The slurry was subjected to solid-liquid separation, thoroughly washed with water, put in 180 ml of a 0.23 mol/liter aqueous cobalt (II) acetate tetrahydrate solution, and the mixture was stirred at 80° C. for 16 hrs. The slurry was subjected to solid-liquid separation, thoroughly washed with water, and dried at 110° C. for 20 hrs, to prepare a catalyst 5. The catalyst was subjected to a chemical analysis to determine the contents of barium, cobalt and silver, and as a result, it was found that barium, cobalt and silver were contained respectively in amounts of 0.67 time, 0.58 time as divalent cobalt and 0.09 time, based on the number of moles of $Al_2O_3$ in the zeolite.

Example 6

Preparation of Catalyst 6

A 20 g amount of ammonium type ZSM-5 prepared in Comparative Example 1 was put in 180 ml of a 1.09 mol/liter aqueous barium chloride solution, and the mixture was stirred at 80° C. for 16 hrs. The slurry was subjected to solid-liquid separation, subsequently put in 180 ml of a 0.2 mol/liter aqueous silver nitrate solution, and the mixture was stirred at 80° C. for 16 hrs. The slurry was subjected to solid-liquid separation, subsequently put in 180 ml of a 0.1 mol/liter aqueous cobalt (II) acetate tetrahydrate solution, and the mixture was stirred at 80° C. for 16 hrs. The slurry was subjected to solid-liquid separation, thoroughly washed with water, and dried at 110° C. for 20 hrs, to prepare a catalyst 6. The catalyst was subjected to a chemical analysis to determine the contents of barium, cobalt and silver, and as a result, it was found that barium, cobalt and silver were contained respectively in amounts of 0.56 time, 0.58 time as divalent cobalt and 0.21 time, based on the number of moles of $Al_2O_3$ in the zeolite.

Comparative Example 2

Preparation of Comparative Catalyst 2

A 200 g amount of ammonium type ZSM-5 prepared in Comparative Example 1 was put in 1800 ml of a 1.09 mol/liter aqueous strontium chloride solution, and the mixture was stirred at 80° C. for 16 hrs. The slurry was subjected to solid-liquid separation, subsequently put in 1800 ml of a 0.23 mol/liter aqueous cobalt (II) acetate tetrahydrate solution, and the mixture was stirred at 80° C. for 16 hrs. The slurry was subjected to solid-liquid separation, the resultant zeolite cake was put in a freshly prepared aqueous solution having the above-described composition, and the above-mentioned procedure was repeated. The slurry was subjected to solid-liquid separation, thoroughly washed with water, and dried at 110° C. for 10 hrs, to prepare a comparative catalyst 2. The catalyst was subjected to a chemical analysis to determine the contents of strontium and cobalt, and as a result, it was found that strontium and cobalt were contained respectively in amounts of 0.23 time and 1.12 times as divalent cobalt, based on the number of moles of $Al_2O_3$ in the zeolite.

Example 7

Preparation of Catalyst 7

A 15 g amount of comparative catalyst 2 prepared in Comparative Example 2 was put in 43 ml of a 0.05 mol/liter aqueous silver nitrate solution, dried under a reduced pressure while stirring, and further dried at 110° C. for 16 hrs, to thereby prepare a catalyst 7. The catalyst was subjected to a chemical analysis to determine the contents of strontium, cobalt and silver, and as a result, it was found that strontium, cobalt and silver were contained in respective amounts of 0.23 time, 1.12 times as divalent cobalt and 0.4 time, based on the number of moles of $Al_2O_3$ in the zeolite.

Example 8

Evaluation of Activity of Catalysts

Catalysts 1 to 7 and comparative catalyst 1 and 2 were each press-molded and then crushed to regulate the size of granules to 12 to 20 meshes, and an atmospheric fixed bed reaction tube was packed with 1 g of each of the granular catalysts. The temperature of the catalyst bed was raised to 500° C. while passing a gas having the following composition (hereinafter referred to as "reaction gas") through the reaction tube at a flow rate of 1000 ml/min, and the temperature was maintained at 500° C. for 0.5 hrs, to thereby conduct a pretreatment. Thereafter, the temperature of the catalyst bed was raised from 300° C. to 500° C. In this case, the temperature was kept constant at each 50° C. increment to measure the catalytic activity at respective temperatures. The $NO_x$ conversions at respective temperatures after the state had become steady are shown in Table 1. The $NO_x$ conversion can be determined by the following equation.

$$NO_x \text{ conversion (\%)} = \frac{(NO_{xin} - NO_{xout})}{NO_{xin}} \times 100$$

wherein $NO_{xin}$: $NO_x$ concentration at inlet of fixed bed reaction tube; and $NO_{xout}$: $NO_x$ concentration at outlet of fixed bed reaction tube.

In all of the catalysts, little carbon monoxide was detected at 450° C. or above, and few hydrocarbons were detected at 400° C. or above.

| Composition of reaction gas: | |
|---|---|
| NO | 700 ppm |
| $O_2$ | 4% |
| $H_2$ | 330 ppm |
| CO | 1000 ppm |
| $H_2O$ | 3% |
| $CO_2$ | 10% |
| $N_2$ | balance |

TABLE I

Results of Evaluation of Activity

| Catalyst | Composition | $NO_x$ conversion (%) | | | | |
|---|---|---|---|---|---|---|
| | | 300° C. | 350° C. | 400° C. | 450° C. | 500° C. |
| Catalyst 1 | Ba Co Ag | 11 | 35 | 63 | 50 | 39 |
| Catalyst 2 | Ba Co Ag | 20 | 70 | 70 | 57 | 44 |
| Catalyst 3 | Ba Co Ag | 14 | 48 | 65 | 52 | 38 |
| Catalyst 4 | Ba Co AgC | 19 | 69 | 71 | 57 | 43 |
| Catalyst 5 | Ag Ba o | 15 | 36 | 40 | 41 | 34 |
| Catalyst 6 | Ba Ag Co | 23 | 52 | 51 | 41 | 29 |
| Catalyst 7 | Sr Co Ag | 14 | 51 | 54 | 42 | 32 |
| Comp Catalyst 1 | Ba Co — | 7 | 34 | 52 | 42 | 30 |
| Comp Catalyst 2 | Sr Co — | 8 | 33 | 51 | 43 | 31 |

Example 9

Evaluation of Durability of Catalysts

Catalyst 1 and comparative catalyst 1 were subjected to an endurance treatment at 800° C. for 5 hrs while flowing the above-mentioned reaction gas, and then subjected to a measurement of the catalytic activity in the same manner as that of Example 8. The $NO_x$ conversions at respective temperatures after the state had become steady are shown in Table 2.

TABLE 2

Results of Evaluation of Activity

| Catalyst | Composition | $NO_x$ conversion (%) | | | | |
|---|---|---|---|---|---|---|
| | | 300° C. | 350° C. | 400° C. | 450° C. | 500° C. |
| Catalyst 1 | Co Ba Ag | 10 | 29 | 46 | 51 | 42 |
| Comp. Catalyst 1 | Co Ba — | 8 | 27 | 45 | 42 | 33 |

Example 10

Preparation of Catalyst 8

A 15 g amount of comparative catalyst 1 prepared in Comparative Example 1 was put in 43 ml of a 0.05 mol/liter aqueous nickel nitrate solution, dried under a reduced pressure while stirring, and further dried at 110° C. for 16 hrs, to thereby prepare a catalyst 8. The catalyst was subjected to a chemical analysis to determine the contents of barium, cobalt and nickel, and as a result, it was found that barium, cobalt and nickel were contained in respective amounts of 0.58 time, 0.49 times as divalent cobalt and 0.4 time, based on the number of moles of $Al_2O_3$ in the zeolite.

Example 11

Preparation of Catalyst 9

A 20 g amount of ammonium type ZSM-5 prepared in Comparative Example 1 was put in 180 ml of a 1.09 mol/liter aqueous barium chloride solution, and the mixture was stirred at 80° C. for 16 hrs. The stirred mixture was subjected to solid-liquid separation, thoroughly washed with water, subsequently put in 180 ml of a 0.23 mol/liter aqueous cobalt (II) nitrate tetrahydrate solution, and the mixture was stirred at 80° C. for 16 hrs. The slurry was subjected to solid-liquid separation, the resultant zeolite cake was put in a freshly prepared aqueous solution having the above-described composition, and the above-mentioned procedure was repeated. The slurry was subjected to solid-liquid separation, thoroughly washed with water, and dried at 110° C. for 10 hrs, and the procedure of Example 10 was repeated to prepare a catalyst 9. The catalyst was subjected to a chemical analysis to determine the contents of barium, cobalt and nickel, and as a result, it was found that barium, cobalt and nickel were contained respectively in amounts of 0.52 time, 0.32 time as divalent cobalt and 0.4 time, based on the number of moles of $Al_2O_3$ in the zeolite.

Example 12

Preparation of Catalyst 10

A catalyst 10 was prepared in the same manner as that of Example 11, except that nickel chloride was used instead of nickel nitrate. The catalyst was subjected to a chemical analysis to determine the contents of barium, cobalt and nickel, and as a result, it was found that barium, cobalt and nickel were contained respectively in amounts of 0.52 time, 0.32 time as divalent cobalt and 0.4 time, based on the number of moles of $Al_2O_3$ in the zeolite.

Example 13

Preparation of Catalyst 11

A catalyst 11 was prepared in the same manner as that of Example 11, except that nickel acetate was used instead of nickel nitrate. The catalyst was subjected to a chemical analysis to determine the contents of barium, cobalt and nickel, and as a result, it was found that barium, cobalt and nickel were contained respectively in amounts of 0.52 time, 0.32 time as divalent cobalt and 0.4 time, based on the number of moles of $Al_2O_3$ in the zeolite.

Example 14

Preparation of Catalyst 12

A 15 g amount of comparative catalyst 2 prepared in Comparative Example 2 was put in 43 ml of a 0.05 mol/liter aqueous nickel nitrate solution, dried under a reduced pressure while stirring, and further dried at 110° C. for 16 hrs, to thereby prepare a catalyst 12. The catalyst was subjected to a chemical analysis to determine the contents of strontium, cobalt and nickel, and as a result, it was found that strontium, cobalt and nickel were contained in respective amounts of 0.23 time, 1.12 times as divalent cobalt and 0.4 time, based on the number of moles of $Al_2O_3$ in the zeolite.

Comparative Example 3

Preparation of Comparative Catalyst 3

A comparative catalyst 3 was prepared in the same manner as that of Comparative Example 2, except that magnesium was used as the alkaline earth metal. The comparative catalyst was subjected to a chemical analysis to determine the contents of magnesium and cobalt, and as a result, it was found that magnesium and cobalt were contained in respective amounts of 0.18 time and 1.08 times as divalent cobalt, based on the number of moles of $Al_2O_3$ in the zeolite.

Example 15

Preparation of Catalyst 13

A 15 g amount of comparative catalyst 3 prepared in Comparative Example 3 was put in 43 ml of a 0.05 mol/liter aqueous nickel nitrate solution, dried under a reduced pressure while stirring, and further dried at 110° C. for 16 hrs, to thereby prepare a catalyst 13. The catalyst was subjected to a chemical analysis to determine the contents of magnesium, cobalt and nickel, and as a result, it was found that magnesium, cobalt and nickel were contained in respective amounts of 0.18 time, 1.08 times as divalent cobalt and 0.4 time, based on the number of moles of $Al_2O_3$ in the zeolite.

Comparative Example 4

Preparation of Comparative Catalyst 4

A comparative catalyst 4 was prepared in the same manner as that of Comparative Example 2, except that calcium was used as the alkaline earth metal. The comparative catalyst was subjected to a chemical analysis to determine the contents of calcium and cobalt, and as a result, it was found that calcium and cobalt were contained in respective amounts of 0.16 time and 1.04 times as divalent cobalt, based on the number of moles of $Al_2O_3$ in the zeolite.

Example 16

Preparation of Catalyst 14

A 15 g amount of comparative catalyst 4 prepared in Comparative Example 4 was put in 43 ml of a 0.05 mol/liter aqueous nickel nitrate solution, dried under a reduced pressure while stirring and further dried at 110° C. for 16 hrs, to thereby prepare a catalyst 14. The catalyst was subjected to a chemical analysis to determine the contents of calcium, cobalt and nickel, and as a result, it was found that calcium, cobalt and nickel were contained in respective amounts of 0.16 time, 1.04 times as divalent cobalt and 0.4 time, based on the number of moles of $Al_2O_3$ in the zeolite.

Comparative Example 5

Preparation of Comparative Catalyst 5

A 20 g amount of ammonium type ZSM-5 prepared in Comparative Example 1 was put in 180 ml of a 0.23 mol/litter aqueous nickel acetate tetrahydrate solution, and the mixture was stirred at 80° C. for 16 hrs. The stirred mixture was subjected to solid-liquid separation, the resultant zeolite cake was put in a freshly prepared aqueous solution having the above-mentioned composition, and the above-mentioned procedure was repeated. The slurry was subjected to solid-liquid separation, washed with water, and dried at 110° C. for 10 hrs, to prepare a comparative catalyst 5. The catalyst was subjected to a chemical analysis to determine the nickel content, and as a result, it was found that nickel was contained as divalent nickel in an amount of 1.40 times the number of moles of $Al_2O_3$ in the zeolite.

Example 17

Preparation of Catalyst 15

A catalyst 15 was prepared in the same manner as that of Example 10, except that zinc nitrate was used instead of nickel nitrate. The catalyst was subjected to cobalt and zinc, and as a result, it was found that barium, cobalt and zinc were contained in respective amounts of 0.58 time, 0.49 times as divalent cobalt and 0.4 time, based on the number of moles of $Al_2O_3$ in the zeolite.

Example 18

Preparation of Catalyst 16

A catalyst 16 was prepared in the same manner as that of Example 11, except that zinc nitrate was used instead of nickel nitrate. The catalyst was subjected to a chemical analysis to determine the contents of barium, cobalt and zinc, and as a result, it was found that barium, cobalt and zinc were contained in respective amounts of 0.52 time, 0.32 times as divalent cobalt and 0.4 time, based on the number of moles of $Al_2O_3$ in the zeolite.

Example 19

Preparation of Catalyst 17

A catalyst 17 was prepared in the same manner as that of Example 14, except that zinc nitrate was used instead of nickel nitrate. The catalyst was subjected to a chemical analysis to determine the contents of strontium, cobalt and zinc, and as a result, it was found that strontium, cobalt and zinc were contained in respective amounts of 0.23 time, 1.12 times as divalent cobalt and 0.4 time, based on the number of moles of $Al_2O_3$ in the zeolite.

Example 20

Evaluation of Activity of Catalysts

Catalysts 8 to 17 and comparative catalysts 1 to 5 were subjected to a measurement of the catalytic activity in the same manner as that of Example 8. The $NO_x$ conversions at respective temperatures after the state had become steady are shown in Table 3.

In all of the catalysts, little carbon monoxide was detected at 450° C. or above, and few hydrocarbons were detected at 400° C. or above.

TABLE 3

| Catalyst | Composition | Results of Evaluation of Activity $NO_x$ conversion (%) | | | | |
|---|---|---|---|---|---|---|
| | | 300° C. | 350° C. | 400° C. | 450° C. | 500° C. |
| Catalyst 8 | Co Ba Ni | 12 | 43 | 56 | 44 | 34 |
| Catalyst 9 | Co Ba Ni | 16 | 54 | 54 | 43 | 32 |
| Catalyst 10 | Co Ba Ni | 11 | 35 | 51 | 42 | 30 |
| Catalyst 11 | Co Ba Ni | 14 | 45 | 53 | 44 | 32 |
| Catalyst 12 | Co Sr Ni | 15 | 52 | 54 | 44 | 33 |
| Catalyst 13 | Co Mg Ni | 13 | 50 | 53 | 43 | 33 |
| Catalyst 14 | Co Ca Ni | 14 | 51 | 54 | 42 | 32 |
| Catalyst 15 | Co Ba Zn | 9 | 35 | 62 | 52 | 43 |
| Catalyst 16 | Co Ba Zn | 7 | 15 | 63 | 51 | 42 |
| Catalyst 17 | Co Sr Zn | 8 | 25 | 58 | 50 | 40 |
| Comp. Catalyst 1 | Co Ba — | 7 | 34 | 52 | 42 | 30 |
| Comp. Catalyst 2 | Co Sr — | 8 | 33 | 51 | 43 | 31 |
| Comp. Catalyst 3 | Co Mg — | 6 | 27 | 49 | 41 | 29 |
| Comp. Catalyst 4 | Co Ca — | 6 | 27 | 48 | 39 | 29 |
| Comp. Catalyst 5 | — — Ni | 10 | 31 | 36 | 32 | 28 |

Example 21

Evaluation of Durability of Catalysts

Catalysts 8 to 17 and Comparative catalysts 1 to 5 were subjected to an endurance treatment at 800° C. for 5 hrs while flowing the above-mentioned reaction gas, and then subjected to a measurement of the catalytic activity in the same manner as that of Example 20. The $NO_x$ conversions at respective temperatures after the state had become steady are shown in Table 4.

TABLE 4

| Catalyst | Composition | Results of Evaluation of Activity $NO_x$ conversion (%) | | | | |
|---|---|---|---|---|---|---|
| | | 300° C. | 350° C. | 400° C. | 450° C. | 500° C. |
| Catalyst 8 | Co Ba Ni | 10 | 33 | 54 | 60 | 52 |
| Catalyst 9 | Co Ba Ni | 8 | 25 | 53 | 59 | 50 |
| Catalyst 10 | Co Ba Ni | 7 | 23 | 50 | 61 | 51 |
| Catalyst 11 | Co Ba Ni | 7 | 21 | 49 | 51 | 44 |
| Catalyst 12 | Co Sr Ni | 7 | 23 | 52 | 58 | 46 |
| Catalyst 13 | Co Mg Ni | 6 | 22 | 48 | 53 | 44 |
| Catalyst 14 | Co Ca Ni | 7 | 21 | 49 | 54 | 45 |
| Catalyst 15 | Co Ba Zn | 8 | 26 | 47 | 45 | 40 |
| Catalyst 16 | Co Ba Zn | 7 | 20 | 40 | 43 | 39 |
| Catalyst 17 | Co Sr Zn | 7 | 20 | 41 | 44 | 38 |
| Comp. Catalyst 1 | Co Ba — | 8 | 27 | 45 | 42 | 33 |
| Comp. Catalyst 2 | Co Sr — | 7 | 26 | 44 | 40 | 32 |
| Comp. Catalyst 3 | Co Mg — | 5 | 21 | 40 | 37 | 29 |
| Comp. Catalyst 4 | Co Ca — | 6 | 23 | 41 | 39 | 29 |
| Comp. Catalyst 5 | — — Ni | 2 | 7 | 21 | 32 | 28 |

Example 22

Preparation of Catalyst 18

A 15 g amount of comparative catalyst 1 prepared in Comparative Example 1 was put in 43 ml of a 0.05 mol/liter aqueous tetraamminedichloroplatinum solution, dried under a reduced pressure while stirring, and further dried at 110° C. for 16 hrs, to thereby prepare a catalyst 18. The catalyst was subjected to a chemical analysis to determine the contents of barium, cobalt and platinum, and as a result, it was found that barium, cobalt and platinum were contained in respective amounts of 0.58 time, 0.49 times as divalent cobalt and 0.4 time, based on the number of moles of $Al_2O_3$ in the zeolite.

Example 23

Preparation of Catalyst 19

A 15 g amount of comparative catalyst 1 prepared in Comparative Example 1 was put in 22 ml of a 0.025 mol/liter aqueous tetraamminedichloroplatinum solution, dried under a reduced pressure while stirring, and further dried at 110° C. for 16 hrs, to thereby prepare a catalyst 19. The catalyst was subjected to a chemical analysis to determine the contents of barium, cobalt and platinum, and as a result, it was found that barium, cobalt and platinum were contained in respective amounts of 0.58 time, 0.49 times as divalent cobalt and 0.1 time, based on the number of moles of $Al_2O_3$ in the zeolite.

Example 24

Preparation of Catalyst 20

A 200 g amount of ammonium type ZSM-5 prepared in Comparative Example 1 was put in 1800 ml of a 1.09 mol/liter aqueous barium chloride solution, and the mixture was stirred at 80° C. for 16 hrs. The stirred mixture was subjected to solid-liquid separation, thoroughly washed with water, subsequently put in 1800 ml of a 0.23 mol/liter cobalt (II) nitrate tetrahydrate solution, and the mixture was stirred at 80° C. for 16 hrs. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, thoroughly washed with water, and dried at 110° C. for 20 hrs, to prepare ZSM-5 containing cobalt and barium. 15 g of the ZSM-5 containing cobalt and barium was put in 43 ml of a 0.05 mol/liter aqueous tetraamminedichloroplatinum solution, dried under a reduced pressure while stirring, and further dried at 110° C. for 16 hrs, to thereby prepare a catalyst 20. The catalyst was subjected to a chemical analysis to determine the contents of barium, cobalt and platinum, and as a result, it was found that barium, cobalt and platinum were contained in respective amounts of 0.52 time, 0.32 time as divalent cobalt and 0.4 time, based on the number the moles of $Al_2O_3$ in the zeolite.

Example 25

Preparation of Catalyst 21

A 15 g of the ZSM-5 containing cobalt and barium prepared in Example 24 was put in 43 ml of a 0.05 mol/liter aqueous manganese acetate solution, dried under a reduced pressure while stirring, and further dried at 110° C. for 16 hrs, to thereby prepare a catalyst 21. The catalyst was subjected to a chemical analysis to determine the contents of barium, cobalt and manganese, and as a result, it was found that barium, cobalt and manganese were contained in respective amounts of 0.52 time, 0.32 time as divalent cobalt and 0.4 time, based on the number of moles of $Al_2O_3$ in the zeolite.

Example 26

Preparation of Catalyst 22

A catalyst 22 was prepared in the same manner as that of Example 25, except that manganese nitrate was used instead of manganese acetate. The catalyst was subjected to a chemical analysis to determine the contents of barium, cobalt and manganese, and as a result, it was found that barium, cobalt and manganese were contained in respective amounts of 0.52 time, 0.32 time as divalent cobalt and 0.4 time, based on the number of moles of $Al_2O_3$ in the zeolite.

Example 27

Preparation of Catalyst 23

A catalyst 23 was prepared in the same manner as that of Example 25, except that manganese chloride was used instead of manganese acetate. The catalyst was subjected to a chemical analysis to determine the contents of barium, cobalt and manganese, and as a result, it was found that barium, cobalt and manganese were contained in respective amounts of 0.52 time, 0.32 time as divalent cobalt and 0.4 time, based on the number of moles of $Al_2O_3$ in the zeolite.

Example 28

Preparation of Catalyst 24

A 15 g amount of comparative catalyst 2 prepared in Comparative Example 2 was put in 43 ml of a 0.05 mol/liter aqueous tetraamminedichloroplatinum solution, dried under a reduced pressure while stirring, and further dried at 110° C. for 16 hrs, to thereby prepare a catalyst 24. The catalyst was subjected to a chemical analysis to determine the contents of strontium, cobalt and platinum, and as a result, it was found that strontium, cobalt and platinum were contained in respective amounts of 0.23 time, 1.12 times as divalent cobalt and 0.4 time, based on the number of moles of $Al_2O_3$ in the zeolite.

Example 29

Preparation of Catalyst 25

A catalyst 25 was prepared in the same manner as that of Example 28, except that manganese nitrate was used instead of tetraamminedichloroplatinum. The catalyst was subjected to a chemical analysis to determine the contents of strontium, cobalt and manganese, and as a result, it was found that strontium, cobalt and manganese were contained in respective amounts of 0.23 time, 1.12 times as divalent cobalt and 0.4 time, based on the number of moles of $Al_2O_3$ in the zeolite.

Example 30

Evaluation of Activity of Catalysts

With respect to catalysts 18 to 25 and comparative catalyst 1 and 2, in the same manner as that of Example 8, the temperature of the catalyst bed was raised from 250° C. to 450° C. In this case, the temperature was kept constant at each 50° C. increment to measure the catalytic activity at respective temperatures. The $NO_x$ conversions at respective temperature after the state had become steady are shown in Table 5.

In the comparative catalysts, little carbon monoxide was detected at 450° C. or above, and few hydrocarbons were detected at 400° C. or above. On the other hand, in the catalysts of examples of the present invention, little carbon monoxide was detected at 400° C. or above, and few hydrocarbons were detected at 350° C. or above.

TABLE 5

| | | Results of Evaluation of Activity | | | | |
|---|---|---|---|---|---|---|
| | Composition | $NO_x$ conversion (%) | | | | |
| Catalyst | | 250° C. | 300° C. | 350° C. | 400° C. | 450° C. |
| Catalyst 18 | Co Ba Pt | 42 | 36 | 30 | 18 | 10 |
| Catalyst 19 | Co Ba Pt | 40 | 25 | 20 | 15 | 9 |
| Catalyst 20 | Co Ba Pt | 38 | 30 | 24 | 15 | 8 |
| Catalyst 21 | Co Ba Mn | 20 | 41 | 52 | 45 | 36 |
| Catalyst 22 | Co Ba Mn | 19 | 35 | 54 | 41 | 34 |
| Catalyst 23 | Co Ba Mn | 16 | 23 | 47 | 45 | 36 |
| Catalyst 24 | Co Sr Pt | 41 | 34 | 28 | 17 | 10 |
| Catalyst 25 | Co Sr Mn | 18 | 34 | 53 | 43 | 35 |
| Comp. Catalyst 1 | Co Ba — | 4 | 7 | 35 | 52 | 42 |
| Comp. Catalyst 2 | Co Sr — | 4 | 8 | 33 | 51 | 43 |

Example 31

Evaluation of Durability of Catalysts

Individual catalysts were subjected to an endurance treatment at 800° C. for 5 hrs, while flowing the above-described reaction gas, and then subjected to a measurement of the catalytic activity in the same manner as that of Example 30. The $NO_x$ conversions at respective temperatures after the state had become steady are shown in Table 6.

TABLE 6

| | | Results of Evaluation of Activity | | | | |
|---|---|---|---|---|---|---|
| | Composition | $NO_x$ conversion (%) | | | | |
| Catalyst | | 250° C. | 300° C. | 350° C. | 400° C. | 450° C. |
| Catalyst 18 | Co Ba Pt | 37 | 37 | 29 | 17 | 9 |
| Catalyst 19 | Co Ba Pt | 23 | 30 | 22 | 14 | 9 |
| Catalyst 20 | Co Ba Pt | 45 | 38 | 27 | 18 | 10 |
| Catalyst 21 | Co Ba Mn | 10 | 12 | 35 | 40 | 38 |
| Catalyst 22 | Co Ba Mn | 10 | 14 | 32 | 39 | 38 |
| Catalyst 23 | Co Ba Mn | 10 | 16 | 35 | 40 | 39 |
| Catalyst 24 | Co Sr Pt | 38 | 34 | 27 | 15 | 10 |
| Catalyst 25 | Co Sr Mn | 10 | 14 | 33 | 39 | 38 |
| Comp. Catalyst 1 | Co Ba — | 4 | 8 | 27 | 45 | 42 |
| Comp. Catalyst 2 | Co Sr — | 4 | 7 | 26 | 44 | 40 |

TABLE 6-continued

| | | Results of Evaluation of Activity | | | | |
|---|---|---|---|---|---|---|
| | Composition | $NO_x$ conversion (%) | | | | |
| Catalyst | | 250° C. | 300° C. | 350° C. | 400° C. | 450° C. |
| 2 | | | | | | |

Example 32

Preparation of Catalyst 26

A 200 g amount of ammonium type ZSM-5 prepared in Comparative Example 1 was put in 1800 ml of a 1.09 mol/liter aqueous barium chloride solution, and the mixture was stirred at 80° C. for 16 hrs. The stirred mixture was subjected to solid-liquid separation, thoroughly washed with water, subsequently put in 1800 ml of a 0.23 mol/liter cobalt (II) nitrate tetrahydrate solution, and the mixture was stirred at 80° C. for 16 hrs. The slurry was subjected to solid-liquid separation, the resultant zeolite cake was put in a freshly prepared aqueous solution having the above-mentioned composition, and the above-mentioned procedure was repeated. The slurry was subjected to solid-liquid separation, thoroughly washed with water, and dried at 110° C. for 20 hrs, to prepare ZSM-5 containing cobalt and barium. 15 g of the ZSM-5 containing cobalt and barium was put in 43 ml of a 0.05 mol/liter aqueous copper acetate solution, dried under a reduced pressure while stirring, and further dried at 110° C. for 16 hrs, to thereby prepare a catalyst 26. The catalyst was subjected to a chemical analysis to determine the contents of barium, cobalt and analysis to determine the contents of barium, cobalt and copper, and as a result, it was found that barium, cobalt and copper were contained in respective amounts of 0.52 time, 0.32 time as divalent cobalt and 0.4 time, based on the number of moles of $Al_2O_3$ in the zeolite.

Example 33

Preparation of Catalyst 27

A catalyst 27 was prepared in the same manner as that of Example 32, except that rhodium nitrate was used instead of copper acetate. The catalyst was subjected to a chemical analysis to determine the contents of barium, cobalt and rhodium, and as a result, it was found that barium, cobalt and rhodium were contained in respective amounts of 0.52 time, 0.32 time as divalent cobalt and 0.4 time, based on the number of moles of $Al_2O_3$ in the zeolite.

Example 34

Preparation of Catalyst 28

A 15 g amount of comparative catalyst 2 prepared in Comparative Example 2 was put in 43 ml of a 0.05 mol/liter aqueous copper nitrate solution, dried under a reduced pressure while stirring, and further dried at 110° C. for 16 hrs, to thereby prepare a catalyst 28. The catalyst was subjected to a chemical analysis to determine the contents of strontium, cobalt and copper, and as a result, it was found that strontium, cobalt and copper were contained in respective amounts of 0.23 time, 1.12 times as divalent cobalt and 0.4 time, based on the number of moles of $Al_2O_3$ in the zeolite.

Example 35

Preparation of Catalyst 29

A catalyst 29 was prepared in the same manner as that of Example 34, except that rhodium nitrate was used instead of copper nitrate. The catalyst was subjected to a chemical analysis to determine the contents of strontium, cobalt and rhodium, and as a result, it was found that strontium, cobalt and rhodium were contained in respective amounts of 0.23 time, 1.12 time as divalent cobalt and 0.4 time, based on the number of moles of $Al_2O_3$ in the zeolite.

Example 36

Evaluation of Activity of Catalysts

Catalysts 26 to 29 comparative catalysts 1 and 2 were subjected to a measurement of the catalytic activity in the same manner as that of Example 8. The $NO_x$ conversions at respective temperatures after the state had become steady are shown in Table 7.

In the comparative catalysts, little carbon monoxide was detected at 450° C. or above, and few hydrocarbons were detected at 400° C. or above. On the other hand, in the catalysts of examples of the present invention, little carbon monoxide was detected at 400° C. or above, and few hydrocarbons were detected at 350° C. or above.

TABLE 7

Results of Evaluation of Activity

| Catalyst | Composition | $NO_x$ conversion (%) | | | | |
|---|---|---|---|---|---|---|
| | | 250° C. | 300° C. | 350° C. | 400° C. | 450° C. |
| Catalyst 26 | Co Ba Cu | 27 | 36 | 49 | 37 | 30 |
| Catalyst 27 | Co Ba Rh | 20 | 26 | 21 | 20 | 15 |
| Catalyst 28 | Co Sr Cu | 26 | 37 | 47 | 38 | 31 |
| Catalyst 29 | Co Sr Rh | 19 | 25 | 22 | 21 | 16 |
| Comp. Catalyst 1 | Co Ba — | 4 | 7 | 35 | 52 | 42 |
| Comp. Catalyst 2 | Co Sr — | 4 | 8 | 33 | 51 | 43 |

As apparent from Tables 1 to 7, the catalysts of the present invention are superior to the comparative catalysts in the capability thereof of purifying an exhaust gas containing an excessive amount of oxygen, in particular, the capability of removing nitrogen oxides.

Specifically,
1) the addition of silver to cobalt and an alkaline earth metal contributes to an improvement in the capability of removing nitrogen oxides,
2) the addition of nickel and/or zinc to cobalt and an alkaline earth metal contributes to an improvement in the capability of removing nitrogen oxides at a high temperature of 350° C. or above,
3) the addition of platinum and/or manganese to cobalt and an alkaline earth metal contributes to an improvement in the capability of removing nitrogen oxides at a low temperature of 350° C. or below, and
4) the addition of copper and/or rhodium to cobalt and an alkaline earth metal contributes to a slight improvement in the capability of removing nitrogen oxides at a low temperature.

Therefore, nitrogen oxides, carbon monoxide and hydrocarbons can be removed with a high conversion by bringing the catalyst of the present invention into contact with an exhaust gas even when the exhaust gas contains an excessive amount of oxygen.

We claim:

1. A method for purifying an exhaust gas by removing nitrogen oxides, carbon monoxide and hydrocarbons from an oxygen-rich exhaust gas containing the same, comprising bringing the exhaust gas into contact with a catalyst comprising (i) a zeolite having an $SiO_2/Al_2O_3$ mole ratio of at least 15 and (ii) (a) cobalt, (b) an alkaline earth metal and (c) silver, incorporated thereinto.

2. A method for purifying an exhaust gas as claimed in claim 1, wherein the contents of cobalt and the alkaline earth metal are 0.1 to 1.5 times and 0.1 to 1 time, respectively, in terms of a mole ratio to the alumina in the zeolite.

3. A method for purifying an exhaust gas as claimed in claim 1, wherein the content of the component (ii) (c) is 0.05 to 2 times, in terms of a mole ratio to the alumina in the zeolite.

4. A method for purifying an exhaust gas as claimed in claim 1, wherein the total content of the metals of the component (ii) (a), (b) and (c) is 1.0 to 2.5 times, in terms of a mole ratio to the alumina in the zeolite.

5. A method for purifying an exhaust gas by removing nitrogen oxides, carbon monoxide and hydrocarbons from an oxygen-rich exhaust gas containing the same, comprising bringing the exhaust gas into contact with a catalyst comprising (i) a zeolite having an $SiO_2/Al_2O_3$ mole ratio of at least 15 and (ii) (a) cobalt, (b) an alkaline earth metal and (c) at least one metal selected from the group consisting of nickel and zinc, incorporated thereinto.

6. A method for purifying an exhaust gas as claimed in claim 5, wherein the contents of cobalt and the alkaline earth metal are 0.1 to 1.5 times and 0.1 to 1 time, respectively, in terms of a mole ratio to the alumina in the zeolite.

7. A method for purifying an exhaust gas as claimed in claim 5, wherein the content of the component (ii) (c) is 0.05 to 2 times, in terms of a mole ratio to the alumina in the zeolite.

8. A method for purifying an exhaust gas as claimed in claim 5, wherein the total content of the metals of the component (ii) (a), (b) and (c) is 1.0 to 2.5 times, in terms of a mole ratio to the alumina in the zeolite.

9. A method for purifying an exhaust gas by removing nitrogen oxides, carbon monoxide and hydrocarbons from an oxygen-rich exhaust gas containing the same, comprising bringing the exhaust gas into contact with a catalyst comprising (i) a zeolite having an $SiO_2/Al_2O_3$ mole ratio of at least 15 and (ii) (a) cobalt, (b) an alkaline earth metal and (c) at least one metal selected from the group consisting of platinum and manganese, incorporated thereinto.

10. A method for purifying an exhaust gas as claimed in claim 9, wherein the contents of cobalt and the alkaline earth metal are 0.1 to 1.5 times and 0.1 to 1 time, respectively, in terms of a mole ratio to the alumina in the zeolite.

11. A method for purifying an exhaust gas as claimed in claim 9, wherein the content of the component (ii) (c) is 0.05 to 2 times, in terms of a mole ratio to the alumina in the zeolite.

12. A method for purifying an exhaust gas as claimed in claim 9, wherein the total content of the metals of the component (ii) (a), (b) and (c) is 1.0 to 2.5 times, in terms of a mole ratio to the alumina in the zeolite.

13. A method for purifying an exhaust gas by removing nitrogen oxides, carbon monoxide and hydrocarbons from an oxygen-rich exhaust gas containing the same, comprising bringing the exhaust gas into contact with a catalyst comprising (i) a zeolite having an $SiO_2/Al_2O_3$ mole ratio of at least 15 and (ii) (a) cobalt, (b) an alkaline earth metal and (c) at least one metal selected from the group consisting of copper and rhodium, incorporated thereinto.

14. A method for purifying an exhaust gas as claimed in claim 13, wherein the contents of cobalt and the alkaline earth metal are 0.1 to 1.5 times and 0.1 and 1 time, respectively, in terms of a mole ratio to the alumina in the zeolite.

15. A method for purifying an exhaust gas as claimed in claim 14, wherein the content of the component (ii) (c) is 0.05 to 2 times, in terms of a mole ratio to the alumina in the zeolite.

16. A method for purifying an exhaust gas as claimed in claim 14, wherein the total content of the metals of the component (ii) (a), (b) and (c) is 1.0 to 2.5 times, in terms of a mole ratio to the alumina in the zeolite.

* * * * *